US005789058A

United States Patent [19]
Usher et al.

[11] Patent Number: 5,789,058
[45] Date of Patent: Aug. 4, 1998

[54] BACKCOATED TEXTILE LOOP PRODUCT

[75] Inventors: Christopher Todd Usher, Greer; Michael P. Sasser, Inman, both of S.C.

[73] Assignee: Milliken Research Corporation, Spartanburg, S.C.

[21] Appl. No.: 816,280

[22] Filed: Mar. 13, 1997

[51] Int. Cl.[6] .......................................... B32B 3/06
[52] U.S. Cl. ........................... 428/88; 428/89; 428/96; 428/100; 428/101
[58] Field of Search ............................. 428/88, 89, 96, 428/100, 101; 66/193

[56] References Cited

U.S. PATENT DOCUMENTS

| | | | |
|---|---|---|---|
| 4,135,024 | 1/1979 | Callahan et al. | 428/171 |
| 4,624,116 | 11/1986 | Rogers | 66/193 |
| 4,919,738 | 4/1990 | Ball et al. | 156/73.5 |
| 4,931,343 | 6/1990 | Becker et al. | 428/100 |
| 5,370,764 | 12/1994 | Alikhan | 156/553 |
| 5,520,021 | 5/1996 | Clerici | 66/193 |

FOREIGN PATENT DOCUMENTS

| | | |
|---|---|---|
| 24 49 460 | 4/1975 | Germany. |
| 58-162346 | 9/1983 | Japan. |
| 63-27468 | 6/1988 | Japan. |

*Primary Examiner*—Terrel Morris
*Attorney, Agent, or Firm*—Terry T. Moyer; Earle R. Marden

[57] ABSTRACT

A hook and loop closure element in which the loop fabric is backcoated and a plurality of the loops on the loop surface are adhered to the backcoating but the remaining free loops provide an efficient loop connector for engagement by a hook fabric. The loop fabric is backcoated using an embossing roller which has selected embodiments thereon to only emboss selected portions of the loop surface to the backcoating thermoplastic resin.

21 Claims, 4 Drawing Sheets

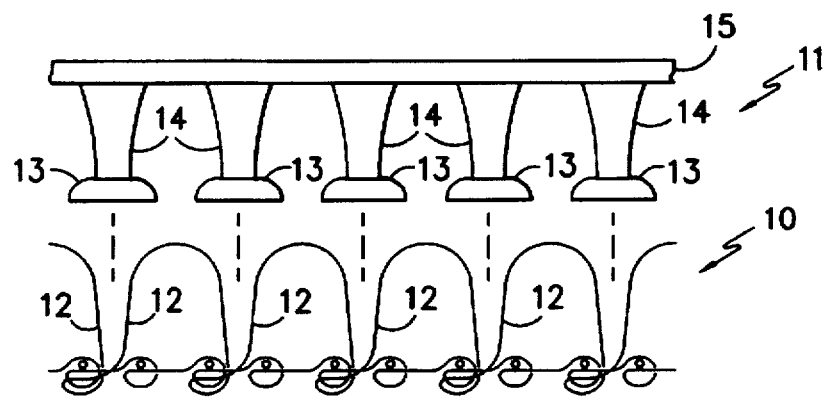
FIG. −1−
PRIOR ART
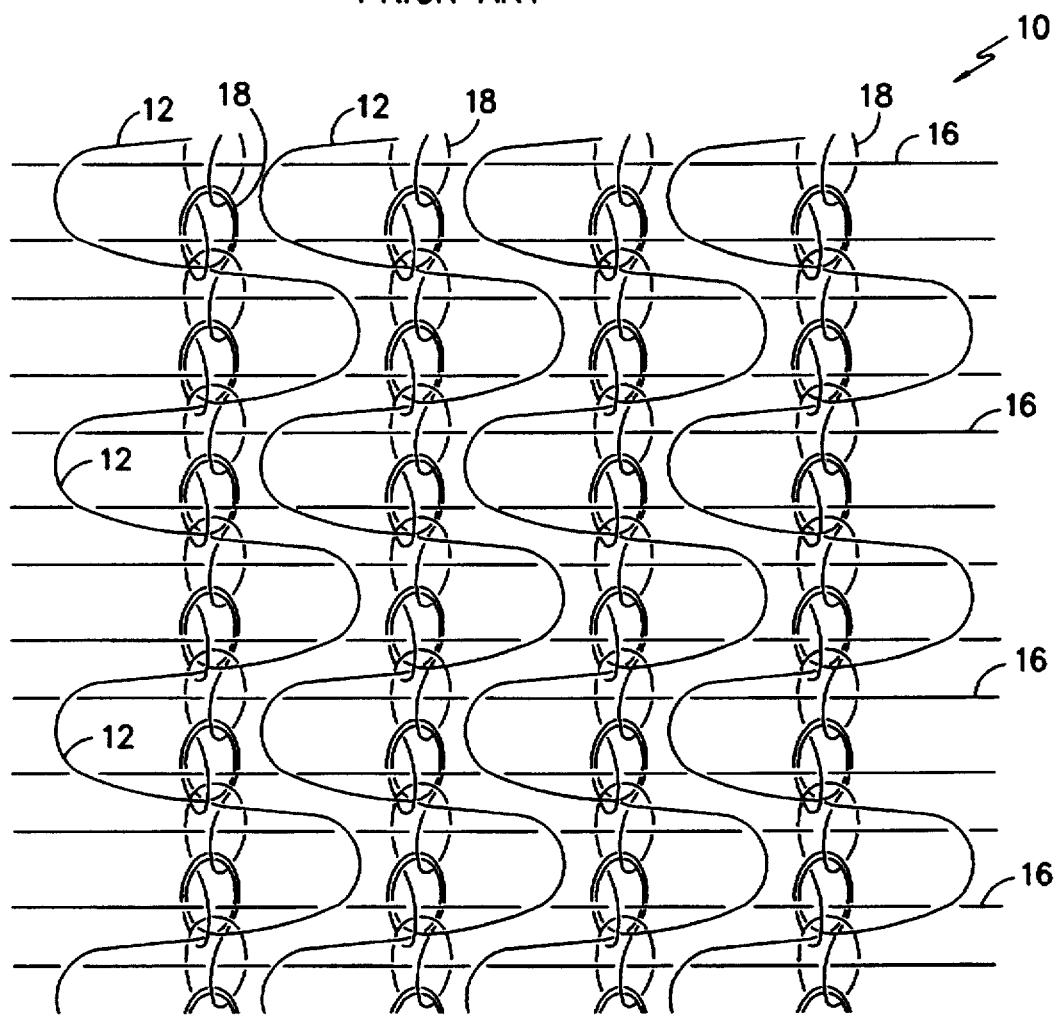
FIG. −2−
PRIOR ART

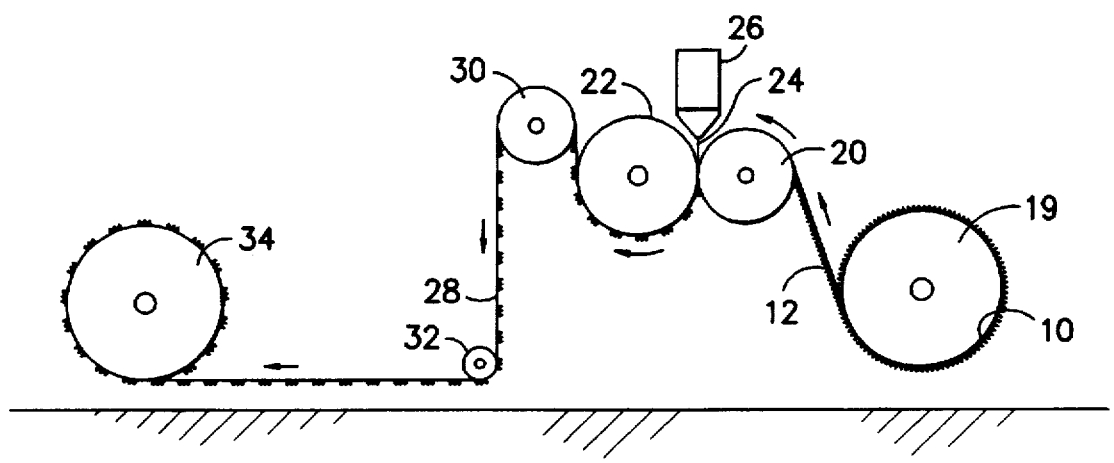
FIG. -3-
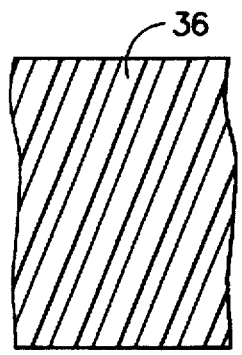
FIG. -4A-
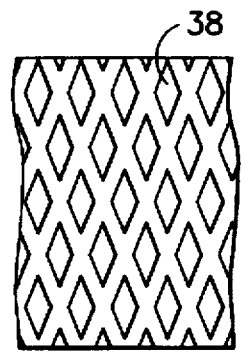
FIG. -4B-
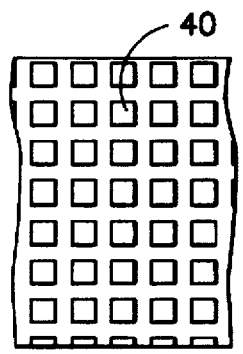
FIG. -4C-
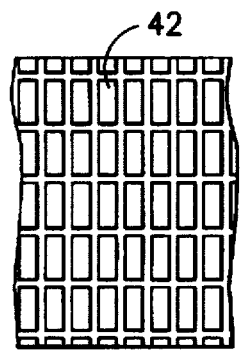
FIG. -4D-

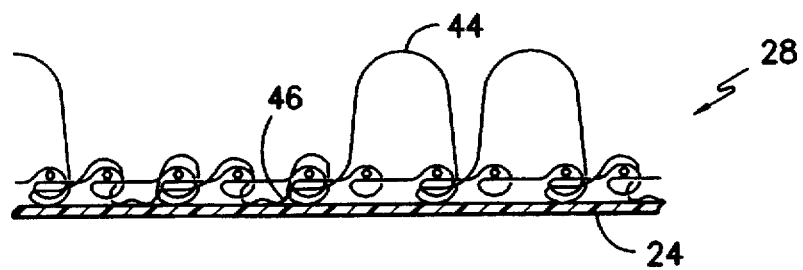
FIG. -5-
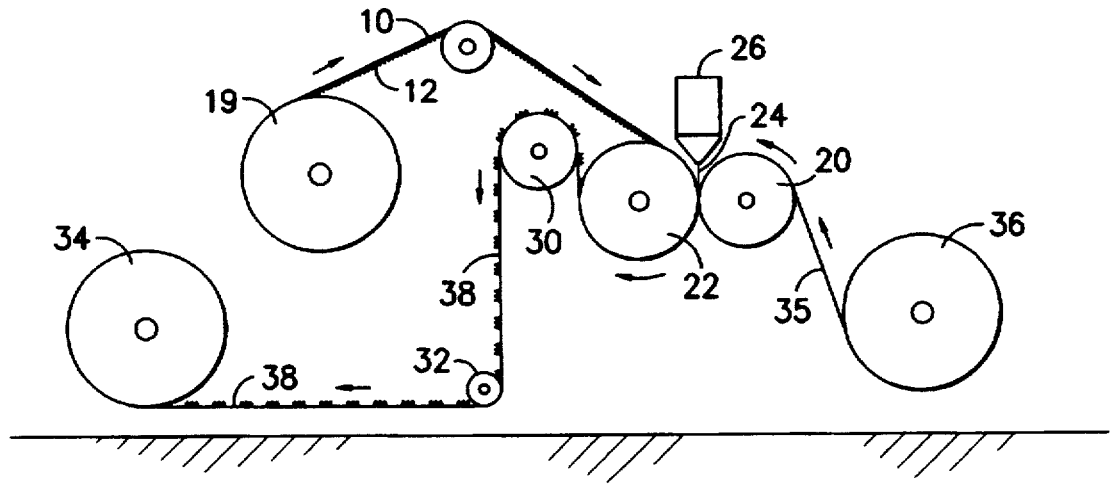
FIG. -6-
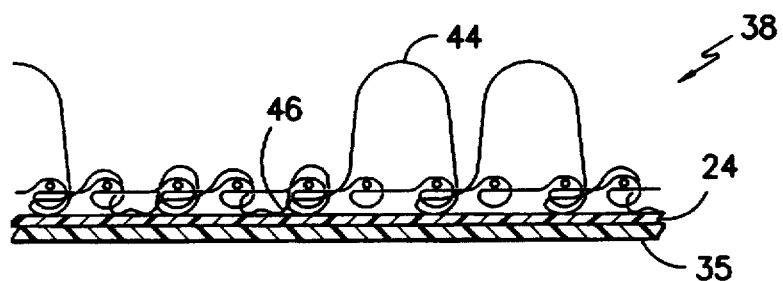
FIG. -7-

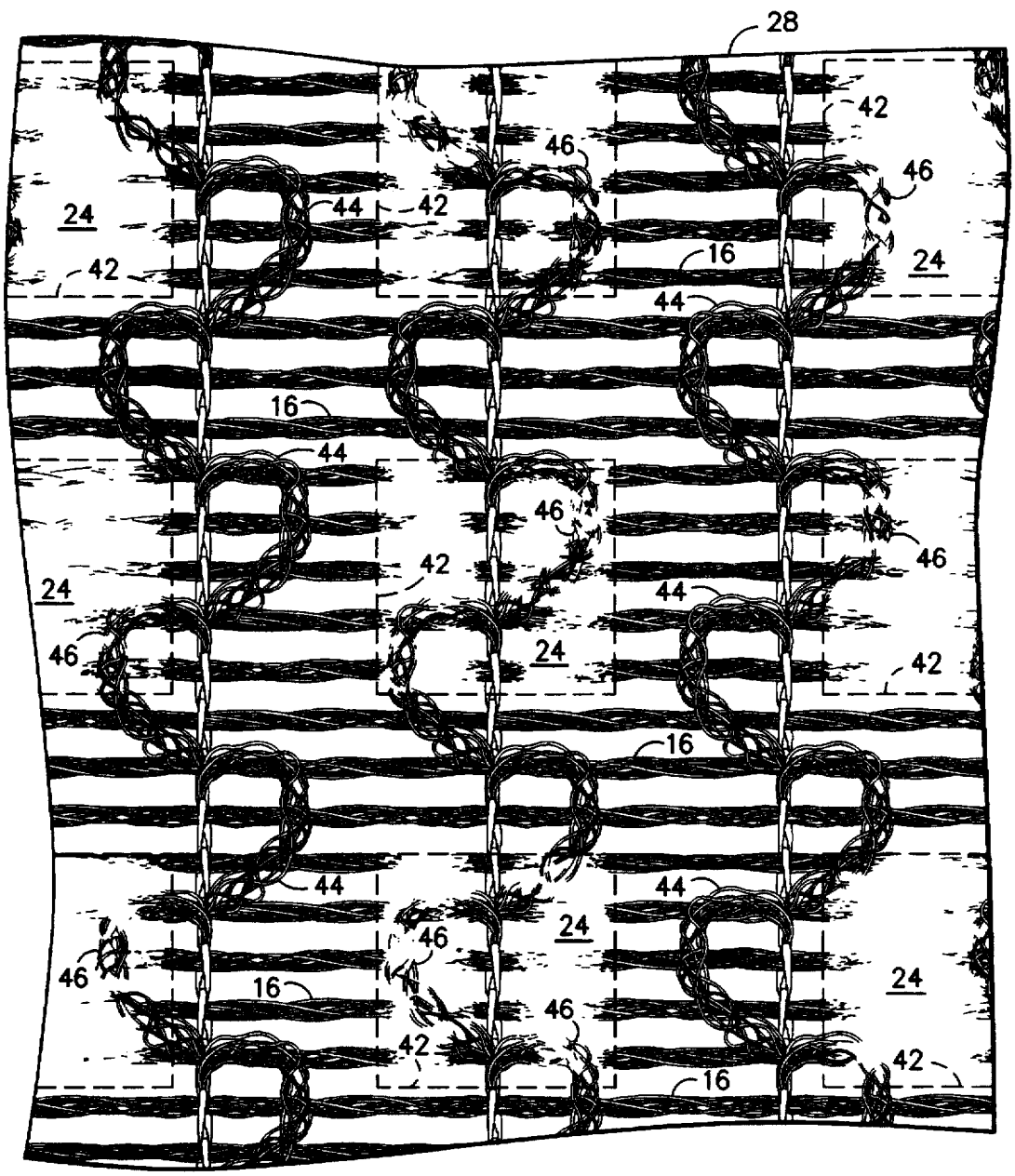
FIG. -8-

5,789,058

BACKCOATED TEXTILE LOOP PRODUCT

This invention relates generally to a hook and loop product to provide a easily openable and closeable mechanical connector and more particular to a back coated loop fabric for use in a hook and loop connector.

Hook and loop connectors of the Velcro®type are well known for a variety of products such as abrasive sanding discs, zippers, doiley fasteners, etc. and basically encompass a hook member of any suitable type which engages and is secured in position on a loop fabric having loops projecting from the surface thereof. A typical type of such a fabric is shown in U.S. Pat. No. 4,624,116 which shows a lightweight warp knit fabric with lap loops projecting therefrom to engage the hooks of a connecting member. Loop fabrics, like the type shown in U.S. Pat. No. 4,624,116, supra, are relatively inexpensive to make but usually have to be backcoated with a stabilizing material to provide structural integrity. These coatings on a fabric as shown in U.S. Pat. No. 4,624,116, supra, tend to seep through the knit construction and glue down the loop structure thereby reducing the peel strength and holding power of the loop fabric.

It is, therefore, an object of the invention to provide an inexpensive backcoated fabric for a hook and loop mechanical fastener which maintains its holding power and peel strength after backcoating.

Other objects and advantages of the invention will become readily apparent as the specification proceeds to describe the invention with reference to the accompanying drawings in which:

FIGS. 1 and 2 show a prior art hook and loop connector fabric which is treated by the herein disclosed invention;

FIG. 3 is a schematic view of the preferred method to backcoat a loop fabric like that shown in FIGS. 1 and 2;

FIGS. 4 A, B, C & D are schematic representation of various embossing rolls which can be used in the backcoating operation;

FIG. 5 is a schematic view of a loop fabric backcoated and embossed by the process of FIG. 3;

FIG. 6 is a modified form of the invention shown in FIG. 3;

FIG. 7 is a view similar to FIG. 5 except the loop product is produced by the method of FIG. 6; and FIG. 8 is a top view similar to FIG. 2 showing the hook connecting surface of the new loop product treated by the process of FIGS. 3 and 6 with the embossing roll shown in FIG. 4C.

Looking now to FIG. 1, the fabric 10 to be backcoated with upstanding loops 12 is shown in a position where it can be engaged by the hook member 11 which consists of the hooks 14 connected to a support member 15. In practice, the fabric 10 would be connected to a supporting structure (not shown in FIG. 1) so that when the article to be secured in a fixed position, to which the hook member 11 is attached, as projected towards the loops 12, the hooks 14 will engage same and be secured therein. The hook member 11 is not, per se, a part of the invention and can be any suitable type, such as that formed by the molding or casting of nylon or other polymers to form the desired configuration shown in FIG. 1.

The substrate fabric 10, as represented in FIG. 2 is a warp, weft inserted fabric knit on a two-bar, weft insertion warp knitting machine. As indicated in FIGS. 1 and 2, the loops 12 are lap loops formed by the front bar yarn of 100 denier textured polyester yarn in the knitting machine while each of the weft inserted yarns 16 are held therein substantially parallel to one another by and between the chain stitch wales 18 formed by the back bar yarn of 40 denier polyester yarn. The weft yarn 16 is preferably 100 denier textured polyester but can be in the range of 40 –150denier. The fabric 10 thereby presents a surface of loops 12 which can be readily manufactured on a warp knitting machine and at the same time provides added strength due to the insertion of the weft yarn 16. The loops 12, as shown in FIG. 1, are free loops in the sense that they are open and project freely upward and are connected only at the base to their respective wale.

It should be noted that the free loops in each wale alternate from one direction to the other along the wale (e.g. in FIG. 2, one loop is to the left and the next adjacent loop in the same wale is to the right). Also the loops in each wale are shifted in the same direction as the loop in the next adjacent wales. This shifting of the loops 12 provides for a more secure and positive engagement of the loops 12 by the grasping portion 13 of the hook member 11 of the male interconnecting member.

In normal backcoating operations, a thermoplastic resin is extruded on the back of the fabric between a pressure roll and a chill roll to provide the desired product. As mentioned previously, when this is done on a loop fabric such as shown in FIG. 2, the resin tends to tie down most of the loops 12 providing unacceptable holding and peel strength. The processes shown in FIGS. 3 and 6 are used to overcome the problem.

Looking now to FIG. 3 the new and improved process will be explained. The substrate 10 supplied from a supply roll 18 is supplied over a roll 20 with the loops 12 facing towards the embossing roll into a nip between the roll 20 and a chill roll 22 which is being supplied a thermoplastic resin 24 from an extruder 26. From the chill roll 22 the backcoated fabric 28 is supplied over guide rolls 30 and 32 to a take-up roll 34. The thermoplastic resin is preferably polypropylene but can be any other suitable resin such as polyethylene, polyester, nylon, EVA or Surlyn.

To prevent adhesion of the loops 12 into the thermoplastic resin, the roll 20 is a pattern or embossed roll with a pattern cut into the roll surface with high areas and low areas so that only a portion of the loops 12 are embedded in the thermoplastic resin when the backcoated fabric 28 is cooled. It is contemplated that sufficient loops 12 will remain free and upright if the pressure area on the roll 20 in contact with the chill roll is in the range of 19% to 80% though the preferred range is 30% –60%.

To provide the above type of contact between the roll 20 and the chill roll 22, various embossing arrangements such as that shown in FIGS. 4A–D. In FIG. 4A, the portions 36 provide the chill roll engaging areas while diamonds 38 in FIG. 4B, squares 40 in FIG. 4C and rectangles 42 in FIG. 4D perform the same function. The particular embossing configuration on the roll 20 is not, per se, part of the invention so long as the selected configuration contacts the loop side of the fabric 12 to allow sufficient free loops to provide the holding and peal characteristics of the hook and loop connector necessary to perform the intended function.

In FIG. 3, it should be noted that the embossing roll 20 contacts the loop side of the fabric but this is merely for efficient location of the machine elements and, if desired, the fabric 12 can be embossed on the side of the fabric away from the loops 12 and obtain the same desired results. This embossment of the non-loop side of the fabric 10 is performed in the modification shown in FIG. 6.

In FIG. 6 a printed planar substrate 35 of a thermoplastic film from the supply roll 36 is passed over the embossing roll 20 in contact with the non-loop side of the fabric 10 at the nip of the chill roll 22 and the embossing roll 20 while the thermoplastic resin 24 is extruded therebetween to laminate the substrate 35 to the fabric 10 as the fabric 10 is being embossed to provide an engageable loop surface. As in FIG. 3, the laminated, embossed fabric 38 is supplied to a take-up roll 34 over guide rolls 30 and 32.

Looking now to FIGS. 5, 7, and 8 and especially FIG. 8, a backcoated loop fabric 28 is shown which was embossed using the configuration of FIG. 4C with the squares 40 indicated by dotted lines 42 in FIG. 8. It can be seen that loops 44 not contacted directly or indirectly by the square 40 are free from the coating 24 while the loops 46 within the confines of the squares 42 are embedded in the coating 24. Further it can be seen that a number of the weft inserted yarns 16 are totally imbedded in the thermoplastic resin and cannot be seen in the surface of the fabric 28.

It can readily be seen that the invention provides a loop fabric for a hook and loop connection that is relatively inexpensive to manufacture which, when coated, provides stability thereto and does not tie down all of the loops of the fabric thereby destroying the retention power or the ease of releasement of the hook and loop connector. Furthermore, the processing disclosed is simple and straight forward eliminating the use of a complicated mechanical apparatus to produce a simple result.

The above described embodiments are given for the purpose of illustration only and modifications may be made within the scope of the invention and we, therefore, desire to be limited by the scope of the claims:

We claim:

1. A loop pile fabric comprising: a fabric having loops projecting therefrom on at least one side of said fabric and a thermoplastic resin bonded and pattern embossed on the side of said fabric opposite said loops and adhered to and anchoring down a number of said loops.

2. The fabric of claim 1 wherein said fabric is a knit fabric.

3. The fabric of claim 3 wherein the number of loops held down by said resin is in the range of 19%–80%.

4. The fabric of claim 2 wherein the percentage of loops held down by said resin is in the range of 30–50%.

5. The fabric of claim 4 wherein said fabric is a warp knit fabric.

6. The fabric of claim 4 wherein a substrate is laminated to the side of said loop pile fabric opposite to said loops.

7. The fabric of claim 6 wherein said fabric is a warp knit fabric.

8. The fabric of claim 7 wherein said loops are lap loops.

9. A hook and loop connector comprising: a knit pile fabric and a hook fabric engaging the loops of the loop pile fabric, said loop pile fabric having a thermoplastic resin bonded and pattern embossed thereon anchoring down from 19% to 80% of the loops on the loop pile fabric preventing engagement by the hooks of said hook fabric.

10. The connector of claim 9 wherein said loop pile fabric is a knit fabric.

11. The connector of claim 10 wherein the number of loops held down is in the range of 30% to 60%.

12. The connector of claim 11 wherein said knit loop pile fabric is a warp knit fabric.

13. A method of providing a loop pile fabric comprising the steps of: supplying a knit fabric having loops projecting outward from one side thereof, supplying the knit fabric into the nip of a chill roll and a pressure roll, supplying a molten thermoplastic resin into the nip of the chill roll and the pressure roll onto the back of said knit fabric opposite said loops, applying a patterned embossing pressure on at least 19–80% of the loops against the chill roll to embed them in the thermoplastic resin as it coats the back of said knit fabric and taking up the coated fabric.

14. The method of claim 13 herein at least 30–60% of the loops are embedded in the thermoplastic resin.

15. The method of claim 14 wherein the pressure is applied against the loop side of said fabric.

16. The method of claim 14 wherein the pressure is applied against the side of said loop fabric opposite to said loops.

17. The method of claim 16 wherein a substrate fabric is supplied into the nip of the chill roll and the pressure roll adjacent the side of said loop fabric opposite to the side from which said loops project and said thermoplastic resin is supplied between said substrate fabric and the side of the loop fabric adjacent thereto.

18. The loop fabric of claim 17 wherein the loop fabric supplied is a warp knit fabric.

19. The method of claim 18 herein at least 30–60% of the loops are embedded in the thermoplastic resin.

20. The loop pile fabric of claim 18 wherein the pressure is applied against the loop side of said loop pile fabric.

21. The loop pile fabric produced by the method of claim 13.

* * * * *

UNITED STATES PATENT AND TRADEMARK OFFICE
CERTIFICATE OF CORRECTION

PATENT NO. : 5,789,058
DATED : August 4, 1998
INVENTOR(S) : Usher, Christopher Todd and Sasser, Michael P.

It is certified that error appears in the above-identified patent and that said Letters Patent is hereby corrected as shown below:

Column 3,
Line 36, after the word "claim" delete -- 3 -- and insert -- 2 --

Signed and Sealed this

Eighth Day of January, 2002

Attest:

JAMES E. ROGAN
Attesting Officer     Director of the United States Patent and Trademark Office